(12) United States Patent
    Maeng

(10) Patent No.: US 11,189,284 B2
(45) Date of Patent: Nov. 30, 2021

(54) APPARATUS FOR COMMUNICATING WITH VOICE RECOGNITION DEVICE, APPARATUS WITH VOICE RECOGNITION CAPABILITY AND CONTROLLING METHOD THEREOF

(71) Applicant: LG ELECTRONICS INC., Seoul (KR)

(72) Inventor: Ji Chan Maeng, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 96 days.

(21) Appl. No.: 16/600,232

(22) Filed: Oct. 11, 2019

(65) Prior Publication Data
    US 2020/0043494 A1    Feb. 6, 2020

(30) Foreign Application Priority Data
    Jul. 19, 2019    (KR) .......... 10-2019-0087783

(51) Int. Cl.
    | | |
    |---|---|
    | *G10L 21/00* | (2013.01) |
    | *G10L 25/00* | (2013.01) |
    | *G10L 21/06* | (2013.01) |
    | *G10L 15/22* | (2006.01) |
    | *E05F 15/74* | (2015.01) |
    | *G06N 20/00* | (2019.01) |

(52) U.S. Cl.
    CPC .............. *G10L 15/22* (2013.01); *E05F 15/74* (2015.01); *G06N 20/00* (2019.01); *E05Y 2400/33* (2013.01); *E05Y 2400/45* (2013.01); *E05Y 2400/85* (2013.01); *E05Y 2900/31* (2013.01)

(58) Field of Classification Search
    CPC ... G10L 15/22; G10L 2015/223; G10L 15/30; G10L 15/26; G06F 3/167; G06F 3/0482
    See application file for complete search history.

(56) References Cited

U.S. PATENT DOCUMENTS

| | | |
|---|---|---|
| 9,275,637 B1 | 3/2016 | Salvador et al. |
| 9,779,732 B2 | 10/2017 | Lee et al. |
| 2009/0204410 A1* | 8/2009 | Mozer .................. G10L 15/30 704/275 |
| 2015/0019017 A1* | 1/2015 | Bodine ................ G05B 19/182 700/275 |

(Continued)

*Primary Examiner* — Olujimi A Adesanya
(74) *Attorney, Agent, or Firm* — Lee, Hong, Degerman, Kang & Waimey PC

(57) ABSTRACT

The present disclosure relates to an apparatus which communicates with a voice recognition device, and a method for controlling an apparatus with a voice recognition capability which operates in the Internet of Things environment configured by a 5G communication network. According to an exemplary embodiment of the present disclosure, an apparatus with a voice recognition capability includes a container which has one open surface and accommodates objects therein, a door which opens/closes the container, a sensor which senses an open/closed state of the door, a microphone which receives an external voice, a voice recognizer which recognizes a voice command received from the microphone, and a controller which controls an active state and an inactive state of the voice recognizer, in which the controller may predict whether the voice recognizer needs to be activated using a deep neural network model learned through the machine learning.

12 Claims, 8 Drawing Sheets

(56) References Cited

U.S. PATENT DOCUMENTS

| | | | | |
|---|---|---|---|---|
| 2015/0198940 A1* | 7/2015 | Hwang | ............... | G05B 15/02 |
| | | | | 700/90 |
| 2015/0294451 A1* | 10/2015 | Lee | ............... | G06K 9/46 |
| | | | | 382/110 |
| 2015/0345065 A1* | 12/2015 | Yang | ............... | G05B 15/02 |
| | | | | 700/275 |
| 2017/0162198 A1* | 6/2017 | Chakladar | ............... | G10L 15/26 |
| 2017/0263247 A1* | 9/2017 | Kang | ............... | G10L 15/30 |
| 2017/0337507 A1* | 11/2017 | Curry | ............... | G07C 9/00182 |
| 2017/0347171 A1* | 11/2017 | Eom | ............... | H04R 1/025 |
| 2017/0347468 A1* | 11/2017 | Kim | ............... | G06F 1/1671 |
| 2017/0350066 A1* | 12/2017 | Kim | ............... | D06F 58/203 |
| 2018/0144590 A1* | 5/2018 | Mixter | ............... | H04L 12/282 |
| 2018/0216867 A1* | 8/2018 | Mynderse | ............... | F25D 17/047 |
| 2018/0249735 A1* | 9/2018 | Espinosa | ............... | A23L 3/003 |
| 2018/0266751 A1* | 9/2018 | Lim | ............... | F25D 29/00 |
| 2018/0286400 A1* | 10/2018 | Seo | ............... | G10L 15/22 |
| 2020/0348905 A1* | 11/2020 | Fischer | ............... | G06F 3/016 |
| 2020/0349942 A1* | 11/2020 | Ahn | ............... | G08C 23/02 |

\* cited by examiner

[FIG. 1]
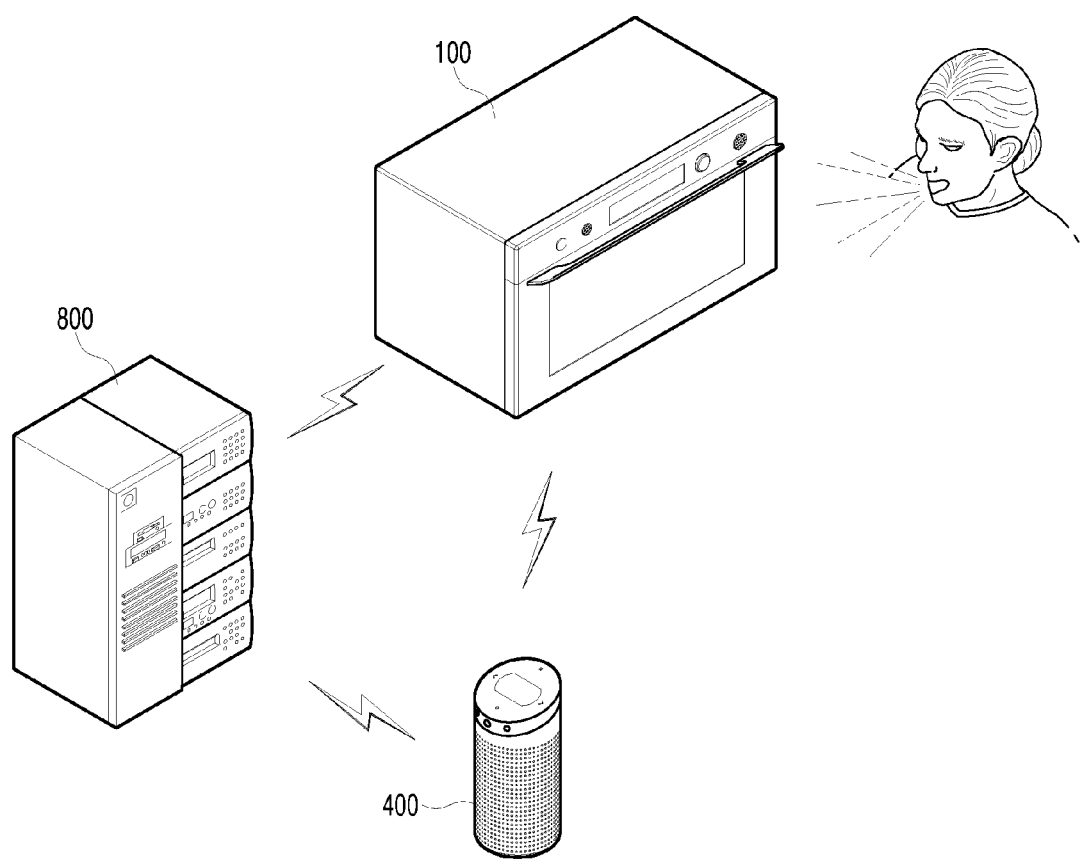

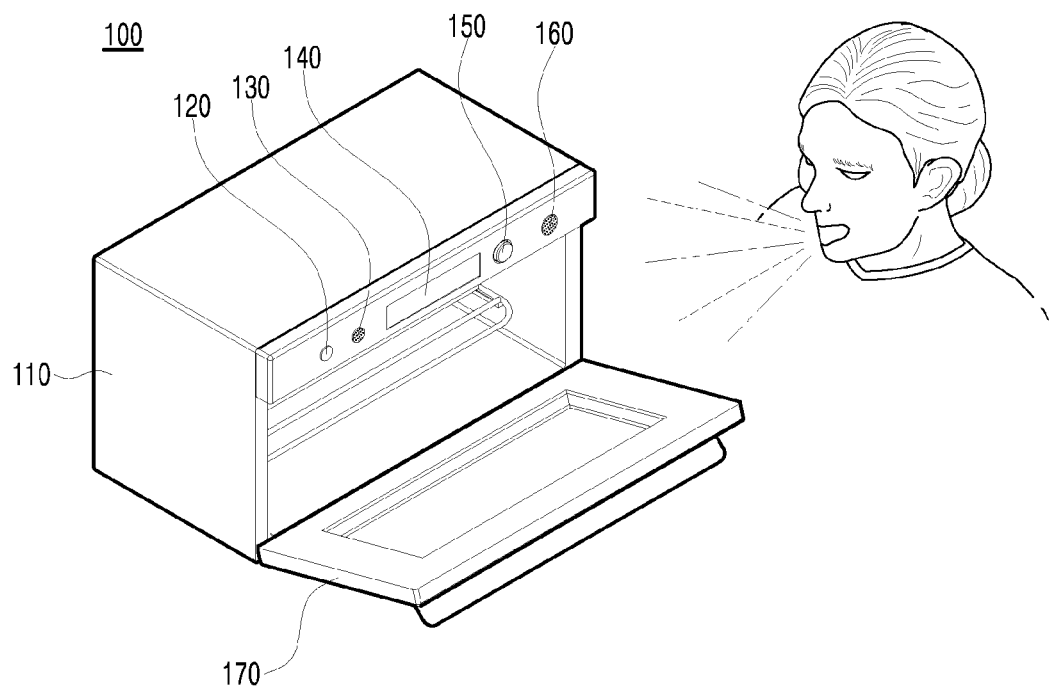
[FIG. 2]

[FIG. 3]
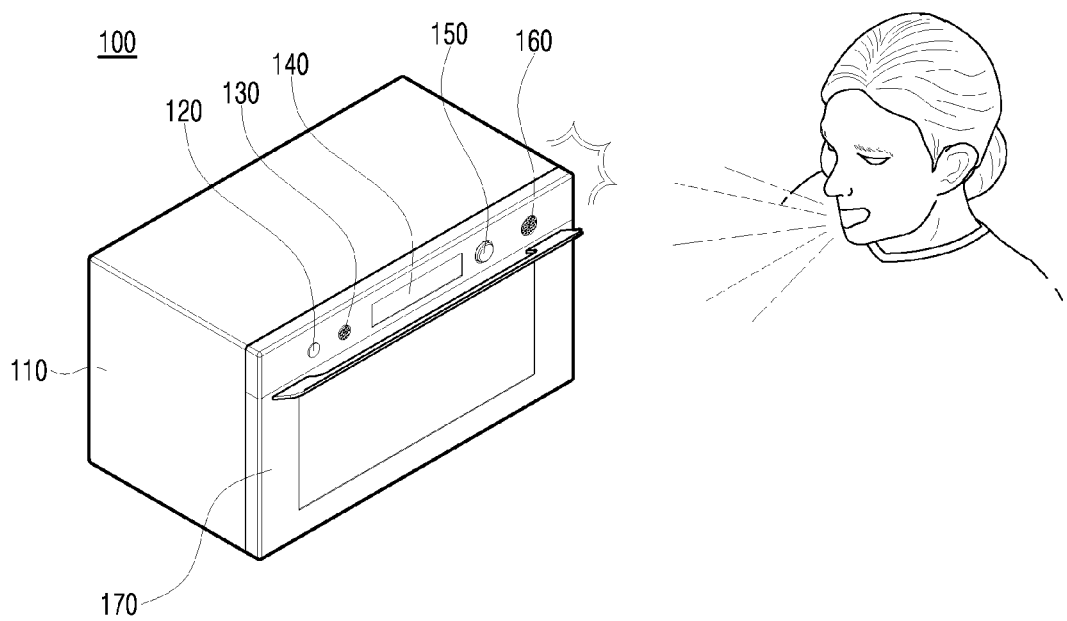

[FIG. 4]
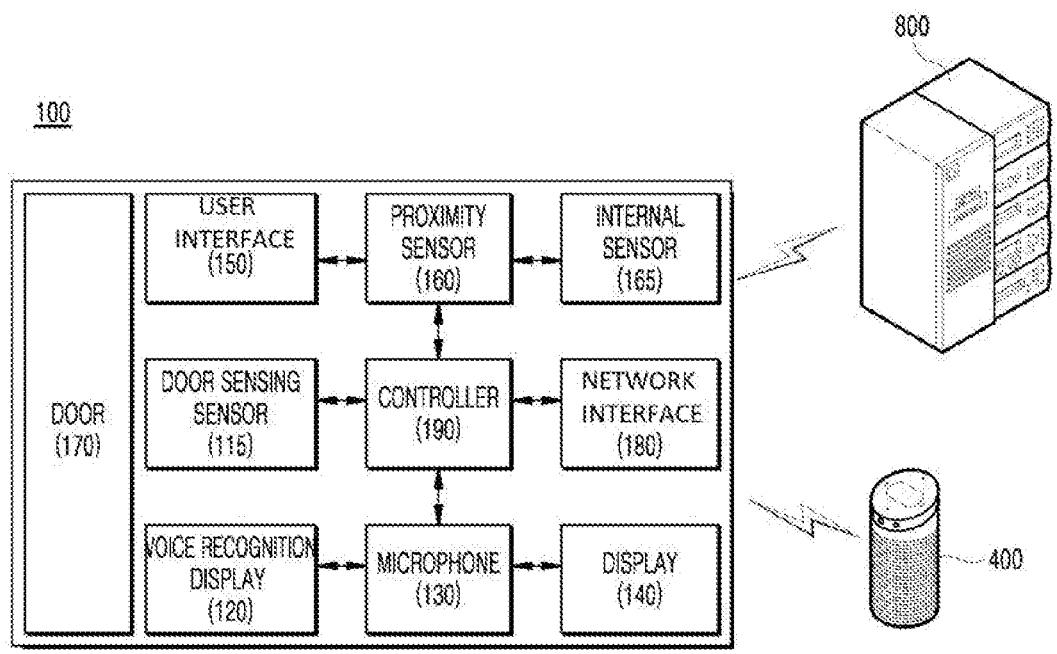

[FIG. 5]
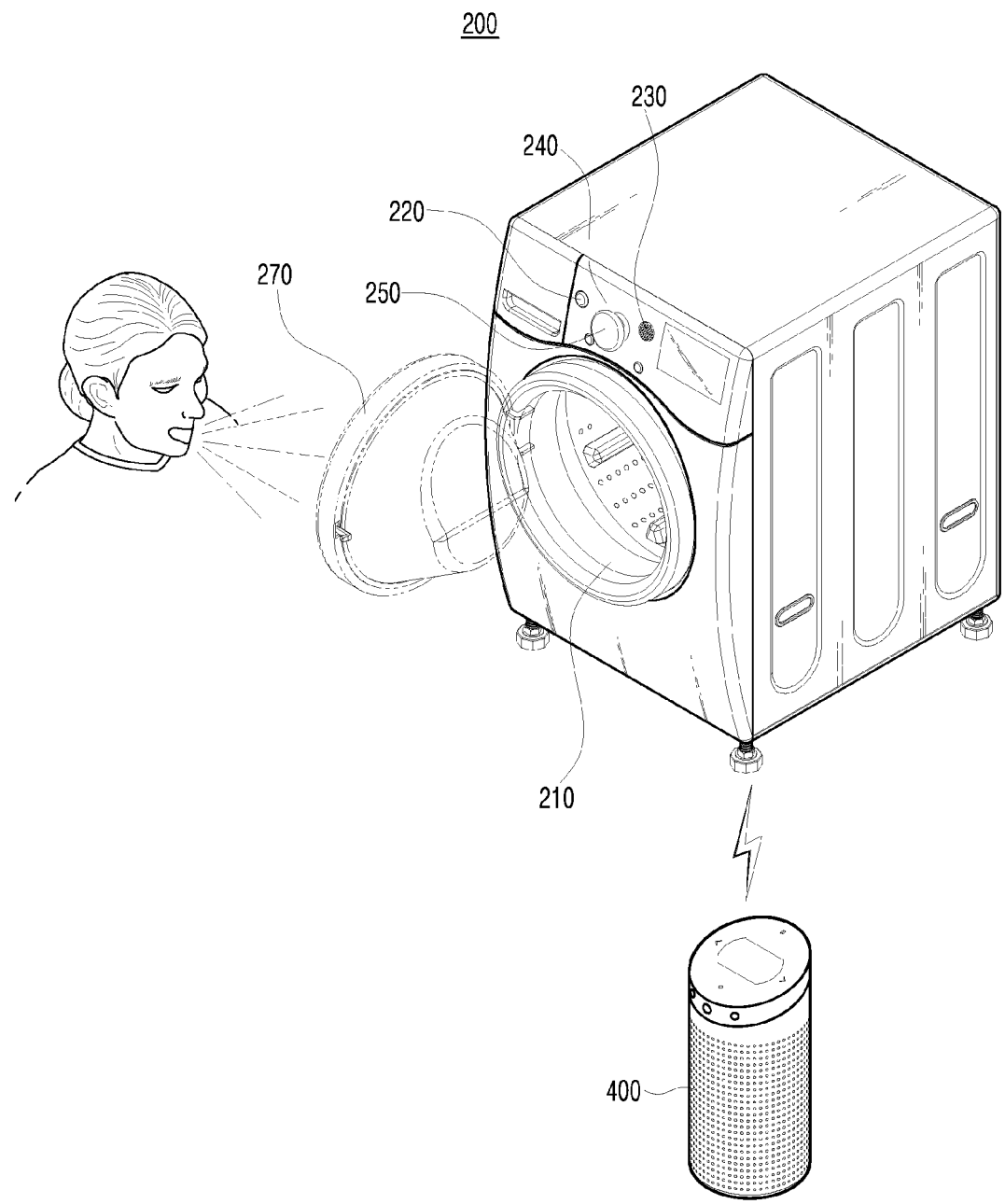

[FIG. 6]
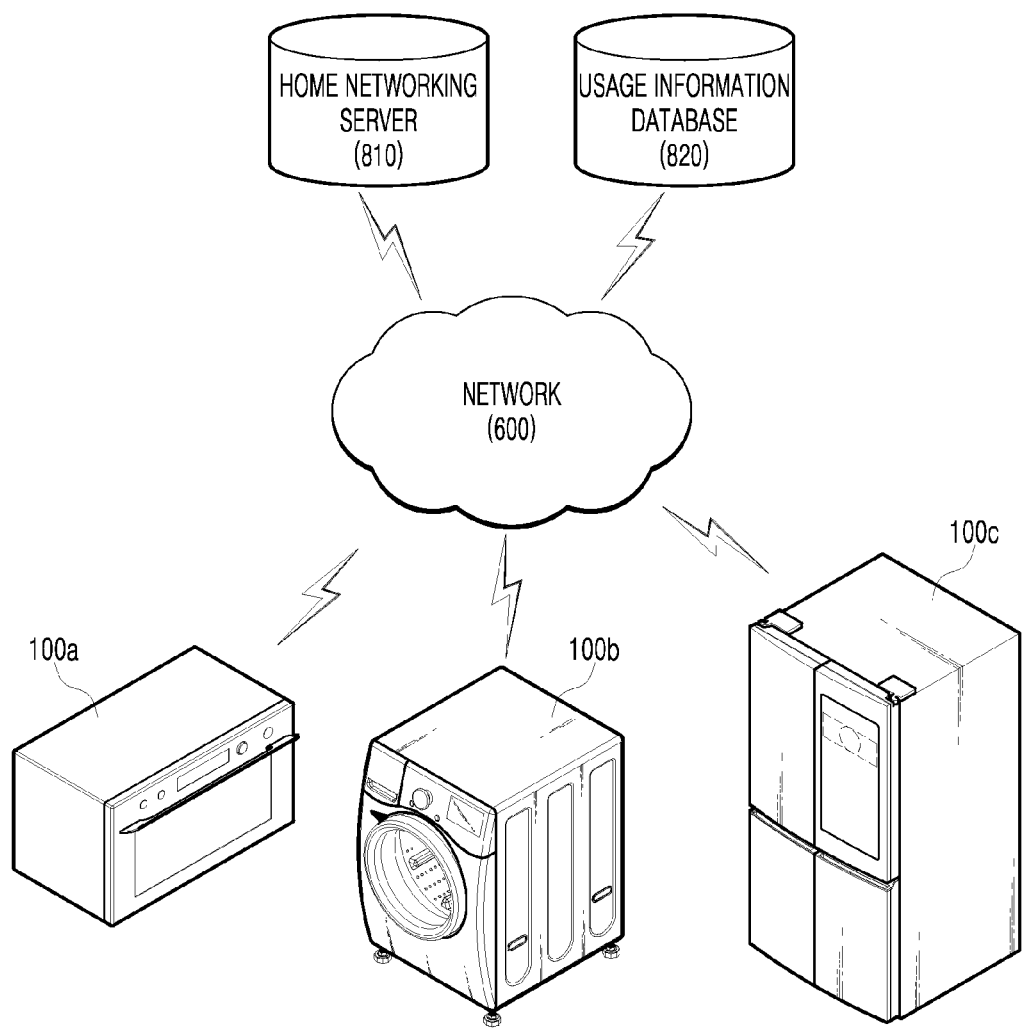

[FIG. 7]
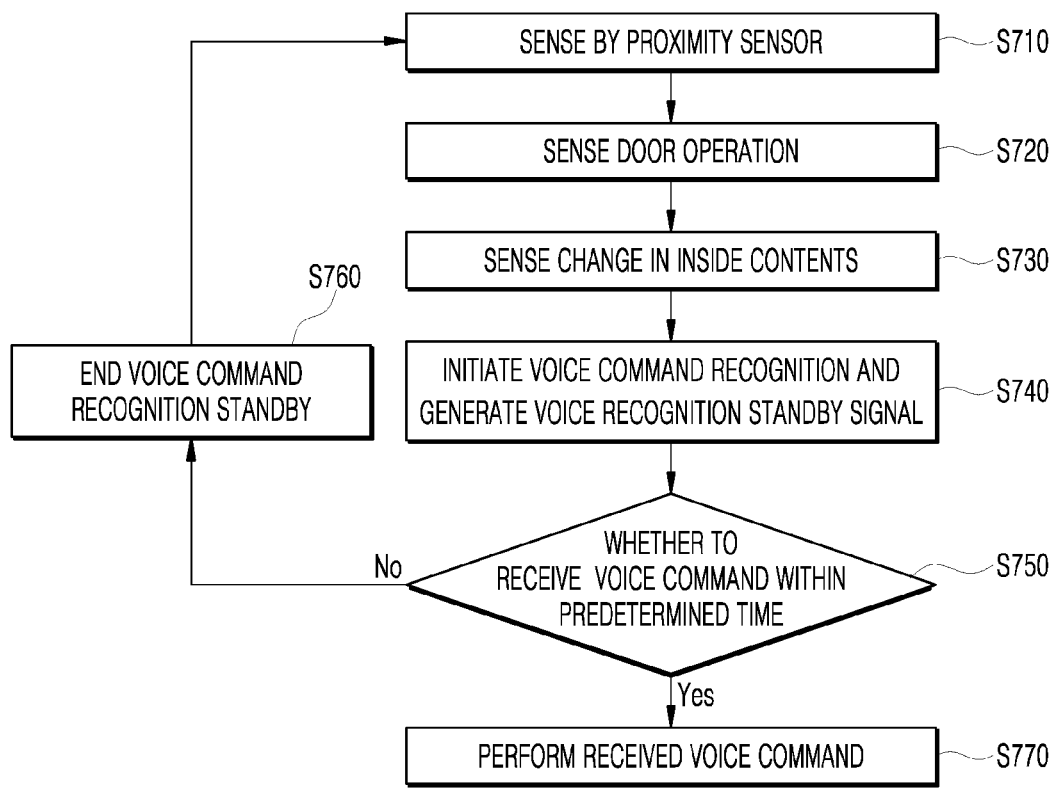

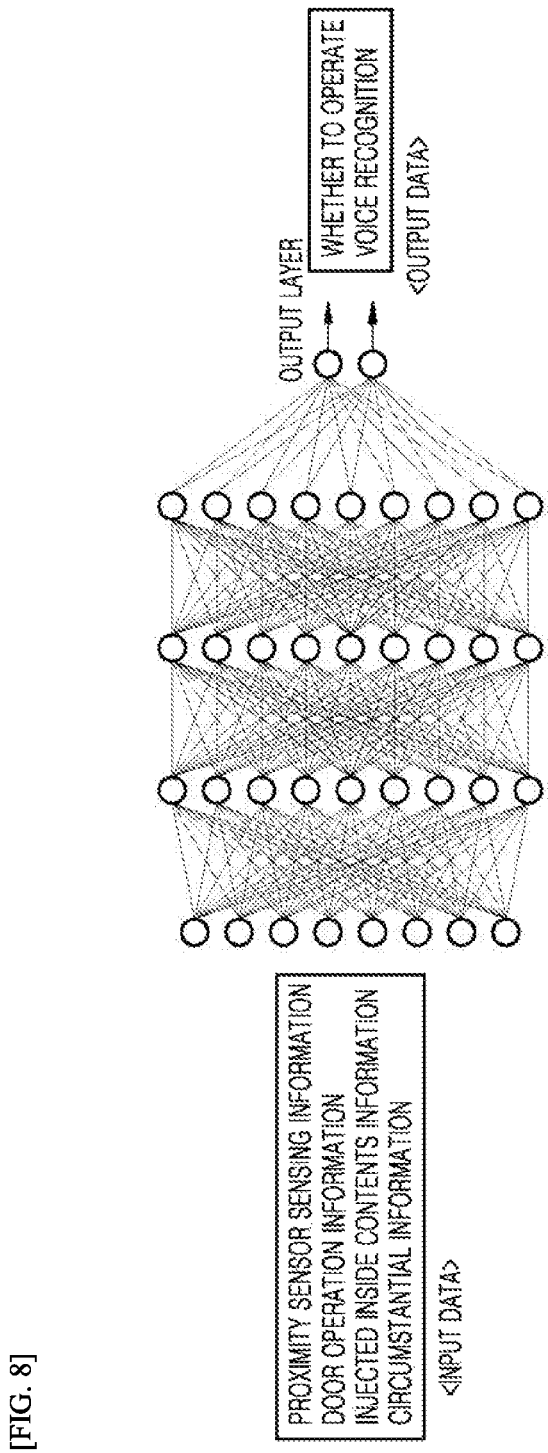

APPARATUS FOR COMMUNICATING WITH VOICE RECOGNITION DEVICE, APPARATUS WITH VOICE RECOGNITION CAPABILITY AND CONTROLLING METHOD THEREOF

CROSS-REFERENCE TO RELATED APPLICATION

Pursuant to 35 U.S.C. § 119(a), this application claims the benefit of earlier filing date and right of priority to Korean Patent Application No. 10-2019-0087783, filed on Jul. 19, 2019, the contents of which are hereby incorporated by reference herein in its entirety.

BACKGROUND

1. Technical Field

The present disclosure relates to an apparatus for communicating with a voice recognition device, an apparatus with a voice recognition capability, and a method for controlling the same, and more particularly, an apparatus and a method which omit a wake-up word in accordance with manipulation of a user for the apparatus and activate a voice recognition function to more easily perform interaction with the user.

2. Description of the Related Art

As technology continues to advance, various services using a voice recognition technology have been introduced in a number of fields. The voice recognition technology is a technology which allows a machine to understand the voice spoken by a human to provide a service desired by the user to allow smoother interaction between the user and the machine.

A voice recognition device to which the voice recognition technology is applied starts the voice recognition only when a specific command is input. This is to prevent power and a processing resource from being excessively consumed when the function for voice command recognition is activated at ordinary times and prevent voice recognition which is not intended by the user.

A specific command which initiates the voice recognition is referred to as a wake-up word and a computational amount of a configuration related to the wake-up word recognition is not so large so that the configuration operates in the voice recognition device at all times. That is, the wake-up word is registered in the voice recognition device in advance. When the wake-up word is included in an uttering voice of the user, the voice recognition device recognizes the wake-up word to transmit a voice signal to an interworking server or perform a designated operation.

U.S. Pat. No. 9,779,732 discloses "a voice recognition method and an electronic device thereof" in which a user's voice signal is recognized using an electronic device and when the user's voice signal is a predetermined keyword (wake-up word), the voice recognition operation is performed.

However, according to the above-described Patent Document, only when the user speaks the wake-up word, the machine starts the voice recognition so that differently from natural conversation, if the user does not speak the specific wake-up word, even though the voice command to the machine is intended, the interaction with the machine is not performed.

Further, U.S. Pat. No. 9,275,637 discloses a "Wake word evaluation" in which a plurality of candidate wake-up words is received to select a word having a highest overall score as a wake-up word.

According to the above-described Patent Document, the wake-up word may be more easily selected and used, but there is still a limitation in that the wake-up word is essential to communicate with the machine.

Therefore, a technology is necessary to understand when a user wants to interact with the machine with voice and activate the voice recognition function of the machine, even without using a wake-up word.

In the meantime, the above-described related arts are technical information acquired by the inventor for the contents to be disclosed or derived from the contents to be disclosed so that it cannot be referred to as known arts disclosed to the general public prior to the filing of the present disclosure.

SUMMARY OF THE INVENTION

An object to be achieved by the present disclosure is to solve the problem in that even though the user wants to interact with the machine using a voice, when a wake-up word is not used, a voice recognition function of the machine is not activated so that the machine cannot recognize the voice.

Further, an object to be achieved by the present disclosure is to solve the problem in that in order for the machine to recognize a voice command of the user without using a wake-up word, a voice recognition function of the machine needs to be activated at all times and in this case, power consumption and processing resource consumption are excessive.

Furthermore, an object to be achieved by the present disclosure is to solve the problem in that when a voice recognition function is activated at all times, even though the user does not intend voice interaction with the machine, the machine may respond the voice of the user.

Furthermore, an object to be achieved by the present disclosure is to solve the problem in that when a separate wake-up word is not spoken, even though the user wants the interaction with the machine, the machine cannot automatically figure out the intention of the user to activate the voice recognition function.

An apparatus which communicates with an apparatus with a voice recognition capability according to an exemplary embodiment of the present disclosure, an apparatus with a voice recognition capability, and a method for controlling the same may recognize a situation in which a user may speak a voice command to an apparatus when a user manipulates the apparatus to activate a voice recognition function, thereby recognizing the voice command of the user without a wake-up word.

The apparatus with a voice recognition capability according to an exemplary embodiment of the present disclosure inactivates a voice recognition function at ordinary times and when a user opens or closes a door of an apparatus with a door, determines it as a situation in which the user may issue a voice command to activate the voice recognition function.

In addition to a situation in which the user opens or closes the door, when the user changes the arrangement of objects in an apparatus which stores the objects, the apparatus with a voice recognition capability according to an exemplary embodiment of the present disclosure may determine it as a situation in which the user may issue a voice command to activate the voice recognition function. Further, in this case, the apparatus may notify the user that it is ready to receive a voice command from the user, through an indicator.

When a user opens or closes a door of an apparatus with a door, an apparatus which communicates with the device having a voice recognition capability according to an exemplary embodiment of the present disclosure determines it as a situation in which the user may issue a voice command to activate the voice recognition function of the device having a voice recognition capability which communicates with the apparatus.

In addition to the situation in which the user opens or closes the door, when the user changes the arrangement of objects in an apparatus which stores the objects, an apparatus which communicates with a device having a voice recognition capability according to an exemplary embodiment of the present disclosure may determine it as a situation in which the user may issue a voice command to activate the voice recognition function of the device having a voice recognition capability. Further, in this case, the apparatus may notify the user that it is ready to receive a voice command from the user, through an indicator.

According to an aspect of the present disclosure, an apparatus with a voice recognition capability includes: a container which has one open surface and accommodates objects therein; a door which opens/closes the container, a sensor which senses an open/closed state of the door, a microphone which receives an external voice, a voice recognizer which recognizes a voice command received from the microphone, and a controller which controls an active state and an inactive state of the voice recognizer.

Here, when a closed state of the door is changed to an open state or the open state of the door is changed to the closed state, the controller may be configured to activate the voice recognizer.

The container includes a camera which photographs the inside of the container, and the controller may be further configured to determine whether there is a change in an arrangement of objects in the container after opening the door, based on an image photographed by the camera, and if there is a change, activate the voice recognizer.

Further, the container includes a weight sensor which senses a weight of an object disposed in the container and the controller is further configured to determine whether there is a change in an arrangement of objects in the container after opening the door, based on weight information of an object disposed in the container sensed by the weight sensor, and if there is a change, activate the voice recognizer.

According to another aspect of the present disclosure, an apparatus with a voice recognition capability further includes: an indicator configured to operate under a predetermined condition and the controller may be further configured to operate the indicator when the voice recognizer is activated.

According to another aspect of the present disclosure, an apparatus with a voice recognition capability further includes: a proximity sensor which determines whether a human approaches the apparatus and the controller may be further configured to activate the voice recognizer when the proximity sensor senses that the human stays within a predetermined range from the apparatus for a predetermined time or longer after the open state of the door is changed to the closed state.

According to another aspect of the present disclosure, an apparatus which communicates with a voice recognition device includes: a container which has one open surface and accommodates objects therein; a door which opens/closes the container, a sensor which senses an open/closed state of the door, a network interface which communicates with an external voice recognition device; and a controller which controls the network interface to transmit a predetermined signal to the voice recognition device through the network interface in accordance with a signal sensed by the sensor.

Here, the controller may be configured to transmit a signal for activating a voice recognizer of the voice recognition device to the voice recognition device through the network interface when a closed state of the door is changed to an open state or the open state of the door is changed to the closed state.

The container includes a camera which photographs the inside of the container and the controller may be further configured to determine whether there is a change in an arrangement of objects in the container after opening the door, based on an image photographed by the camera, and if there is a change, transmit a signal for activating the voice recognizer of the voice recognition device to the voice recognition device through a network interface.

Further, the container includes a weight sensor which senses a weight of an object disposed in the container and the controller may be further configured to determine whether there is a change in an arrangement of objects in the container after opening the door, based on weight information of an object disposed in the container sensed by a weight sensor, and if there is a change, transmit a signal for activating the voice recognizer of the voice recognition device to the voice recognition device through a network interface.

According to another aspect of the present disclosure, an apparatus which communicates with a device having a voice recognition capability may further include: an indicator configured to operate under a predetermined condition and the controller may be further configured to operate the indicator when a signal for activating the voice recognizer of the voice recognition device is transmitted to the voice recognition device through the network interface.

According to another aspect of the present disclosure, an apparatus which communicates with a device having a voice recognition capability may further include: a proximity sensor which determines whether a human approaches the apparatus and the controller may be further configured to transmit a signal for activating the voice recognizer of the voice recognition device to the voice recognition device through a network interface when the proximity sensor senses that the human stays within a predetermined range from the apparatus for a predetermined time or longer after the open state of the door is changed to the closed state.

According to an aspect of the present disclosure, a method for controlling an apparatus with a voice recognition capability includes: sensing whether a door of the apparatus is open; determining whether an object is added into a container of the apparatus or removed from the container of the apparatus; activating a voice recognizer when an object is added into the apparatus or removed the object from the inside of the apparatus after opening the door; analyzing and performing a voice command when the voice command is received within a predetermined time after activating the voice recognizer; and inactivating the voice recognizer when the voice command is not received within a predetermined time after activating the voice recognizer.

Here, the container includes a camera which photographs the inside of the container, and in the determining, it is determined whether there is a change in the arrangement of objects in the container after opening the door, based on an image photographed by the camera.

Further, the container includes a weight sensor which senses a weight of an object disposed in the container and in the determining, it is determined whether there is a change in the arrangement of objects in the container after opening the door, based on weight information of an object disposed in the container sensed by the weight sensor.

According to another aspect of the present disclosure, an apparatus with a voice recognition capability further includes: an indicator configured to operate under a predetermined condition and in the method for controlling an apparatus with a voice recognition capability, the activating of a voice recognizer may include operating an indicator.

According to another aspect of the present disclosure, an apparatus with a voice recognition capability further includes: a proximity sensor which determines whether a human approaches the apparatus and the method for controlling an apparatus with a voice recognition capability may further include: activating the voice recognizer when the proximity sensor senses that the human stays within a predetermined range from the apparatus for a predetermined time or longer after the open state of the door is changed to the closed state.

According to another aspect of the present disclosure, an apparatus with a voice recognition capability comprises a container having an opening at one side and configured to accommodate an object therein, a door located at the one side and configured to open and close to cover the opening, a sensor configured to sense an open or closed state of the door, a microphone configured to receive audio, and a controller configured to activate a voice recognizer of the apparatus in connection with a closed state of the door being changed to an open state or the open state of the door being changed to the closed state.

Further, the apparatus may comprise a camera configured to capture an image of an interior of the container, and the controller may be further configured to activate the voice recognizer based on detecting a change in an arrangement of the object in the container based on the captured image after the closed state of the door is changed to the open state.

Further, the apparatus may comprise a weight sensor configured to sense a weight of the object in the container, and the controller may be further configured to activate the voice recognizer based on detecting a change in an arrangement of the object in the container based on weight information sensed via the weight sensor after the closed state of the door is changed to the open state.

Further, the apparatus may comprise an indicator configured to indicate when the voice recognizer is activated, Further, the apparatus may comprise a proximity sensor configured to detect a presence of a person, the controller may be further configured to activate the voice recognizer when the person is detected, via the proximity sensor, within a predetermined range for a predetermined length of time after the open state of the door is changed to the closed state.

According to another aspect of the present disclosure, an apparatus for use in a system capable of voice recognition may comprise a container having an opening at one side and configured to accommodate an object therein, a door located at the one side and configured to open and close to cover the opening, a sensor configured to sense an open or closed state of the door, a network interface configured to communicate with an external voice recognition device, and a controller configured to transmit, via the network interface, a signal for activating a voice recognizer of the external voice recognition device in connection with a closed state of the door being changed to an open state or the open state of the door being changed to the closed state.

Further, the apparatus may comprise a camera configured to capture an image of an interior of the container, and the controller may be further configured to transmit, via the network interface, a signal for activating the voice recognizer of the external voice recognition device based on detecting a change in an arrangement of the object in the container based on the captured image after the closed state of the door is changed to the open state.

Further, the apparatus may comprise a weight sensor configured to sense a weight of the object in the container, and the controller may be further configured to transmit, via the network interface, a signal for activating the voice recognizer of the external voice recognition device based on detecting a change in an arrangement of the object in the container based on weight information sensed via the weight sensor after the closed state of the door is changed to the open state.

Here, the external voice recognition device may further comprise an indicator configured to indicate when the voice recognizer is activated, and wherein the transmitted signal causes the indicator to be operated.

Further, the apparatus may comprise a proximity sensor configured to detect a presence of a person, and the controller may be further configured to transmit, via the network interface, a signal for activating the voice recognizer of the external voice recognition device when the person is detected, via the proximity sensor, within a predetermined range for a predetermined length of time after the open state of the door is changed to the closed state.

According to another aspect of the present disclosure, a method for controlling an apparatus with a voice recognition capability may comprise sensing an open or closed state of a door of the apparatus, activating a voice recognizer when an object is inserted into the apparatus or removed from the apparatus after a closed state of the door is changed to an open state, and performing a command when a voice command for the command is received within a predetermined time after activating the voice recognizer or inactivating the voice recognizer when a voice command is not received within a predetermined time after activating the voice recognizer.

Other aspects, features, and advantages other than those described above will become apparent from the following drawings, claims, and the detailed description of the present invention.

According to the exemplary embodiment of the present disclosure, the machine appropriately determines when the user wants to voice-interact with the apparatus to activate the voice recognition function without using the wake-up word, thereby providing an environment in which the user may more naturally voice-interact with the apparatus.

Further, according to the exemplary embodiment of the present disclosure, a voice recognition function of the apparatus is inactive at ordinary times, but when the user wants to voice-interact with the apparatus, the voice recognition function of the apparatus is automatically activated, thereby saving the power consumption and processing resource and providing the voice recognition service by the apparatus.

Further, according to the exemplary embodiment of the present disclosure, a voice recognition function is inactive at ordinary times, but only when the user intends voice-interaction with the apparatus, the voice recognition function of the apparatus is automatically activated so that an erroneous operation when the user does not intend the voice-interaction with the apparatus may be prevented.

Furthermore, according to the exemplary embodiment of the present disclosure, even though a separate wake-up word is not uttered, it is determined when the user wants to interact with the machine, so that the user and the machine may naturally voice-interact with each other.

The effects of the present disclosure are not limited to those mentioned above, and other effects not mentioned can be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which:

FIG. 1 is a view for explaining an environment in which an apparatus with a voice recognition capability according to an exemplary embodiment of the present disclosure operates;

FIG. 2 is a view for explaining an operation of a voice recognition function when a door of an apparatus with a voice recognition capability according to an exemplary embodiment of the present disclosure is open;

FIG. 3 is a view for explaining an operation of a voice recognition function when a door of an apparatus with a voice recognition capability according to an exemplary embodiment of the present disclosure is closed;

FIG. 4 illustrates a block diagram of an apparatus with a voice recognition capability according to an exemplary embodiment of the present disclosure;

FIG. 5 is a view for explaining an example in which an apparatus with a voice recognition capability according to another exemplary embodiment of the present disclosure recognizes a voice command of a user;

FIG. 6 is a view for explaining an example in which devices having a voice recognition capability according to another exemplary embodiment of the present disclosure interwork with an external server through a network;

FIG. 7 is a flowchart for explaining an operation of an apparatus with a voice recognition capability according to another exemplary embodiment of the present disclosure; and FIG. 8 is a view for explaining a method of determining whether a voice recognition function is activated in an apparatus with a voice recognition capability according to an exemplary embodiment of the present disclosure.

DETAILED DESCRIPTION

Advantages and features of the present disclosure and methods of achieving the advantages and features will be more apparent with reference to the following detailed description of example embodiments in connection with the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, the terms such as "first," "second," and other numerical terms may be used herein only to describe various elements, but these elements should not be limited by these terms. Furthermore, these terms such as "first," "second," and other numerical terms, are used only to distinguish one element from another element.

Hereinbelow, the example embodiments of the present disclosure will be described in greater detail with reference to the accompanying drawings, and on all these accompanying drawings, the identical or analogous elements are designated by the same reference numeral, and repeated description of the common elements will be omitted.

FIG. 1 is a view for explaining an environment in which an apparatus with a voice recognition capability according to an exemplary embodiment of the present disclosure operates.

Although various electronic devices and home appliances may be apparatus with a voice recognition capability, for the convenience of description, an oven and an artificial intelligence speaker will be described as examples.

An oven 100 having a voice recognition capability may communicate with an artificial intelligence speaker 400 and a home server 800. The oven 100, the artificial intelligence speaker 400, and the home server 800 may communicate with each other through a short-range/long-distance wired/wireless communication method.

The oven 100 having a voice recognition capability may include a microphone and a voice recognizer. The oven 100 does not activate the voice recognizer at ordinary times, but when an external voice is received so that a voice matching the wake-up word is generated, the oven 100 may activate the voice recognizer. Further, when a user performs a specific action, for example, opens a door of the oven 100, puts foods in the oven 100, takes out foods from the oven 100, or closes the door of the oven 100 without uttering the wake-up word, the oven 100 may sense the action to determine that the voice-interaction with the user may occur. The voice recognizer, which can be referred to as a speech recognizer, may be implemented as a hardware component, a software component, or a combination thereof. The voice recognizer may be a processor designed for natural language processing.

In this case, even though the wake-up word is not input, the oven 100 may activate the voice recognizer to enter a voice recognition standby mode to receive a voice command from the user.

When the voice recognizer is activated, the oven 100 may notify that the voice recognizer is activated, through an indicator. For example, the indicator may be an LED and the LED may emit light to notify the user that the voice recognizer is activated. As another example, the indicator may be a speaker and a voice saying "what can I do for you?" is generated through the speaker to notify the user that the interaction is ready using a voice.

When the oven 100 receives a voice command, the oven 100 may utilize own voice processing processor to analyze the voice command and perform an operation according to the voice command. As another exemplary embodiment, the oven 100 may transmit the voice command to the home server 800 or the artificial intelligence speaker 400 having a natural language processing function and receive a response appropriate for the voice command figured out by the natural language processing from the home server 800 or the artificial intelligence speaker 400.

The oven 100 may perform an operation suitable for the voice command of the user based on the received response.

In the meantime, when the oven 100 does not have a voice recognition capability, if the user performs a specific action, for example, opens the door of the oven 100, puts foods in the oven 100, or takes out the food from the oven, or closes the door of the oven 100 and the oven 100 senses the action to determine that the voice interaction with the user may occur, the oven 100 may transmit a voice recognition function activating signal to the artificial intelligence speaker 400.

The artificial intelligence speaker 400 which receives the voice recognition function activating signal may activate the voice recognition function without inputting the wake-up word to enter a voice recognition standby mode which is capable of receiving the voice command from the user.

After transmitting the voice recognition function activating signal to the artificial intelligence speaker 400, the oven 100 may notify the user that the voice recognition function of the artificial intelligence speaker 400 is activated, through an indicator disposed in the oven 100.

According to another exemplary embodiment, when the voice recognition function of the artificial intelligence speaker 400 is activated, the user may be notified that the voice recognition function of the artificial intelligence speaker 400 is activated, through an indicator included in the artificial intelligence speaker 400.

The home server 800 may be configured to communicate with home appliances to implement Internet of Things in a 5G communication environment. Here, the home server 800 may communicate with the oven 100 and the artificial intelligence speaker 400 to receive the voice command of the user and determine a necessary operation therefor to notify the oven 100 and the artificial intelligence speaker 400.

The home server 800 may interwork with a database server which provides big data required to apply various artificial intelligence algorithms and data for voice recognition. In addition, the server 800 may include a web server or an application server which remotely controls the oven 100 and the artificial intelligence speaker 400 using an application or a web browser installed in the user terminal.

FIG. 2 is a view for explaining an operation of a voice recognition function when a door of an apparatus with a voice recognition capability according to an exemplary embodiment of the present disclosure is open.

Referring to FIG. 2, the oven 100 may include a container 110, a voice recognition display 120, a microphone 130, a display 140, a user interface 150, a proximity sensor 160, and a door 170.

The container 110 has one open surface and may accommodate a bowl for receiving foods and food ingredients therein. The door 170 may be coupled to the container 110 to open/close one surface of the container 110.

The voice recognition display 120 may serve as an indicator which displays whether the voice recognizer is activated in the oven 100 or the artificial intelligence speaker 400 interworking with the oven 100. The voice recognition display 120 may be an LED and if it is determined that voice-interaction is necessary in accordance with a specific operation of the user, the LED may emit light to notify the user that it is ready to receive the voice command.

The microphone 130 of the oven 100 may receive a voice uttered by the user. When the user utters a wake-up word to the microphone 130, the wake-up word determination module determines whether a predetermined wake-up word is included in the utterance of the user to determine whether to activate the voice recognizer.

The display 140 may visually provide information on the operation of the oven 100 to the user.

The user may manipulate the user interface 150 to determine the operation of the oven 100 or set an operation condition. As illustrated in FIG. 2, the user interface 150 may be a control dial.

The proximity sensor 160 senses a human who approaches the oven 100 to provide information determining whether the user has come close to the oven 100 to use the oven 100. When it is determined that the user approaches the oven 100 by the proximity sensor 160, the oven 100 may be configured to determine that the user may issue a voice command to activate the voice recognizer.

Even though not illustrated in FIG. 2, the oven 100 may include a door sensor to sense an open/closed state of the door 170. The door sensor may recognize that the door is open or closed to transmit the recognition to the controller of the oven 100 to determine an operation which is performed on the oven 100 by the user.

When the user approaches the oven 100 to open the door 170 of the oven 100, it may be predicted that the user may perform an arbitrary operation on the oven 100. Therefore, when it is sensed that the door of the oven 100 is open, the voice recognizer is automatically activated and the oven 100 may be ready to receive the voice command of the user.

Further, the voice recognition display 120 may emit light to notify the user that the voice recognition function is activated.

Further, even though not illustrated in FIG. 2, the oven 100 may further include an external camera. The external camera may visually sense which activity is performed by a user adjacent to the oven 100. Images collected by the external camera may be used to assist the user to determine what operation is ordered to the oven 100 with the voice.

FIG. 3 is a view for explaining an operation of a voice recognition function when a door of an apparatus with a voice recognition capability according to an exemplary embodiment of the present disclosure is closed.

When the user opens the door 170 of the oven 100, puts the food therein, and then closes the door 170, it may be predicted that the user manipulates the oven 100 to perform a heating operation. Therefore, when the user closes the door 170, the oven 100 may activate the voice recognition function.

In the meantime, when the proximity sensor 160 senses that the user does not leave the oven 100 after closing the door 170 and stays within a predetermined range (for example, within 30 cm) from the oven 100 for a predetermined time (for example, 15 seconds or longer), the oven 100 may predict that the user may issue a voice command and activate the voice recognizer.

FIG. 4 illustrates a block diagram of an apparatus with a voice recognition capability according to an exemplary embodiment of the present disclosure.

The oven 100 according to the exemplary embodiment of the present disclosure may include a door sensing sensor 115 which senses an operation of the door 170, a voice recognition display 120 which displays that the voice recognizer is activated, a microphone 130 which collects external voice, a display 140 which displays information to the user, a user interface 150 for manipulation of the user, a proximity sensor 160 which determines whether the user approaches the oven 100, an internal sensor 165 which senses a change in the oven 100, a network interface 180 which communicates with external devices, and a controller 190 which controls the above-mentioned components. The network interface 180 may include a transmitter, a receiver and/or a transceiver.

Further, even though not illustrated in FIG. 4, when the oven 100 has a voice recognition function by itself, the oven 100 may further include a voice recognizer. The voice recognizer maintains an inactive state at ordinary times, but when it is determined that a user may issue a voice command to the oven 100, the voice recognizer may be activated.

The network interface 180 may transmit a predetermined signal to external devices in accordance with determination of the controller 190 based on signals of the sensors 160 and 165. The external devices may be an artificial intelligence speaker 400, an external server 800, or other electronic devices.

The door sensing sensor 115 may sense the open/closed state of the door 170 to determine whether the user is using the oven 100. When a closed state of the door 170 is changed to an open state or an open state of the door 170 is changed to a closed state, the controller 190 may activate the voice recognizer.

When the oven 100 has its own voice recognition function therein, the controller 190 may activate the voice recognizer and when the oven 100 does not have own voice recognition function, the controller 190 may transmit a voice recognition activating signal to a device having a voice recognition function through the network interface 180. For example, the device which receives a voice recognition activating signal may be the artificial intelligence speaker 400 which is disposed to be close to the oven 100.

The oven 100 may include an internal sensor 165 which is capable of sensing a change in the container 110 and the internal sensor 165 may be an internal camera which photographs the inside of the container. The internal camera may photograph the inside of the container at all times, but in consideration of power consumption, the internal camera may be configured to operate only when the inside of the container may be changed. For example, the internal camera photographs the inside of the container when an operation of opening the door 170 of the oven 100 starts and after opening the door to sense whether there is a change in the arrangement of the objects therein. More specifically, the internal camera may be configured to periodically photograph the inside when an operation of opening the door 170 starts and until the door 170 is closed after a predetermined time since the door 170 is open to sense whether there is a change in the arrangement of the objects therein based on a signal of the door sensing sensor 115. As another exemplary embodiment, the internal camera may be configured to photograph the inside when an operation of opening the door 170 starts and an operation of closing the door 170 starts or after closing the door 170 to sense whether there is a change in the arrangement of the objects therein based on the signal of the door sensing sensor 115.

In the meantime, the internal sensor 165 may be a weight sensor which is capable of sensing a weight of an object disposed in the container 110. The controller 190 may determine whether there is a change in the arrangement of objects in the container 110 after opening the door 170, based on weight information of an object disposed in the container 110 sensed by the weight sensor. The weight sensor may sense the weight of the inside of the container 110 at all times, but in consideration of power consumption, the weight sensor may be configured to operate only when there is a change in the inside of the container. For example, the weight sensor may sense the weight of the inside of the container when an operation of opening the door 170 of the oven 100 starts and after opening the door to sense whether there is a change in the arrangement of the objects therein. More specifically, the weight sensor may be configured to periodically sense the weight of the inside when an operation of opening the door 170 of the oven 100 starts and until the door 170 is closed after a predetermined time since the door 170 is open to sense whether there is a change in the arrangement of the objects therein, based on the signal of the door sensing sensor 115. As another exemplary embodiment, the weight sensor may be configured to sense the weight of the inside when an operation of opening the door 170 of the oven 100 starts, when an operation of closing the door 170 starts, or after closing the door 170 to sense whether there is a change in the arrangement of the objects therein, based on the signal of the door sensing sensor 115.

As sensed by the internal sensor 165 as described above, the oven 100 may sense a situation in which the user puts foods in the oven 100 or the user removes the foods from the oven 100. In this situation, a subsequent operation of the oven 100 may be requested so that the controller 190 of the oven 100 may determine that the user may issue a voice command to generate a signal which activates a voice recognizer.

The generated signal may activate the voice recognition function of the oven 100 or activate a voice recognition function of a device having a voice recognition capability which communicates with the oven 100, for example, a voice recognition function of the artificial intelligence speaker 400.

In the meantime, after putting the foods in the oven and closing the door 170, the user may find out a cooking procedure and instruct the oven 100 to perform the specific cooking procedure. Therefore, after the open state of the door 170 is changed to a closed state, when the proximity sensor senses that the human stays within a predetermined range from the apparatus for a predetermined time or longer (for example, 15 seconds or longer), the controller 190 may be further configured to activate the voice recognizer.

Even though not illustrated in FIG. 4, the oven 100 may include a memory in which various operation information is stored.

The memory records various information required for the operation of the oven 100 and may include a volatile or non-volatile recording medium. The recording medium stores data readable by the controller 190 and may include a hard disk drive (HDD), a solid state disk (SSD), silicon disk drive (SDD), ROM, RAM, CD-ROM, a magnetic tape, a floppy disk, an optical data storage device, and the like.

In the meantime, data for voice recognition may be stored in the memory and the controller 190 may process an uttered voice signal of the user which is received through the microphone 130 and perform the voice recognition process.

FIG. 5 is a view for explaining an example in which an apparatus with a voice recognition capability according to another exemplary embodiment of the present disclosure recognizes a voice command of a user.

In FIG. 5, an apparatus with a voice recognition capability is a washing machine 200. The washing machine 200 may include a washing machine main body 240, a washing tub 210 which is a container for storing laundry, a proximity sensor 220 which senses the approaching of the user, a microphone 230 which collects the voice of the user, a control dial 250 which sets an operation of the washing machine 200, and a door 270.

When a closed state of the door 270 is changed to an open state or the open state is changed to the closed state, the washing machine 200 may be configured to activate the voice recognizer.

When the user may approach the washing machine 200 to open the door 270 and put the laundry into the washing tub 210, the user may order the washing machine 200 to perform a specific setting or a specific operation. Therefore, the washing machine 200 may be configured to activate the voice recognizer in accordance with the motion of the door 270 so as to naturally perform the voice interaction between the user and the washing machine 200 without using a separate wake-up word.

Furthermore, when the washing machine 200 does not include its own voice recognizer, the washing machine 200 may communicate with a device with a voice recognition function which is disposed to be close to the washing machine 200. Here, the device having a voice recognition function may be various user terminals such as a smart phone, a tablet, an artificial intelligence speaker 400, and the like.

The user terminal may include a communication terminal which performs a function of a computing device and may include, but is not limited to: a desktop computer, a smart phone, a notebook, a tablet PC, a smart TV, a mobile phone, a personal digital assistant (PDA), a laptop computer, a media player, a micro server, a global positioning system (GPS), an electronic book terminal, a digital broadcasting terminal, a navigation, a kiosk, an MP3 player, a digital camera, home appliances, and other mobile or non-mobile computing devices which are manipulated by the user.

Further, the user terminal may be a wearable terminal such as a watch, glasses, a hair band, and a ring with a communication function and a data processing function. The user terminal is not limited thereto and a terminal which is capable of recognizing a voice may be adapted without restriction.

An operation of the washing machine 200 which activates the voice recognizer to be ready for the voice command of the user or transmitting the voice recognizer activating signal to the user terminal may be similarly performed as described with reference to FIGS. 3 and 4.

FIG. 6 is a view for explaining an example in which devices having a voice recognition capability according to another exemplary embodiment of the present disclosure interwork with an external server through a network.

An oven 100a, a washing machine 100b, and a refrigerator 100c may be connected to a home networking server 810 through a network 600 in a 5G communication environment.

The home networking server 810 may control various indoor facilities such as home appliances and lightings installed at home. Further, the home networking server 810 may control such that the home appliances do not independently operate, but an operation of one home appliance may be adjusted in accordance with an operation of the other home appliance based on each operation information of the home appliance.

Further, the home network server 810 may receive a manipulating operation of the user and voice command of the user collected from apparatuses 100a, 100b, and 110c having voice recognition capability to accumulate the information in the usage information database 820.

Data which records usage information of one user accumulated in the usage information database 820 serves as information which reflects a feature of the user so that home appliances controlled by the home networking server 810 may operate as an user-customized type.

The learning model for determining whether to activate the voice recognizer in each home appliance may be updated based on the usage information database 820 and thus, unnecessary activation of the voice recognizer may be reduced and the voice recognizer may be activated only when the user is highly likely to perform the voice command.

The network 600 may serve to connect the voice recognition devices 100 and the user terminal to each other. The network 600 may include wired networks such as local area networks (LANs), wide area networks (WANs), metropolitan area networks (MANs), or integrated service digital networks (ISDNs) and wireless networks such as wireless LANs, CDMA, Bluetooth, and satellite communication, but the scope of the present disclosure is not limited thereto.

Further, the network 600 may transmit and receive information using near field communication and/or long distance communication. Here, the near field communication may include Bluetooth, radio frequency identification (RFID), infrared data association (IrDA), ultra-wideband (UWB), Zigbee, and wireless fidelity (Wi-Fi) techniques and the long distance communication may include code division multiple access (CDMA), frequency division multiple access (FDMA), time division multiple access (TDMA), orthogonal frequency division multiple access (OFDMA), single carrier frequency division multiple access (SC-FDMA) techniques.

The network 600 may include connection of network elements such as a hub, a bridge, a router, a switch, and a gateway. The network 600 may include one or more connected networks including a public network such as the Internet and a private network such as a secure corporate private network, for example, multiple network environments. Access to the network 600 may be provided by one or more wired or wireless access networks.

FIG. 7 is a flowchart for explaining an operation of an apparatus with a voice recognition capability according to another exemplary embodiment of the present disclosure.

When the user approaches an apparatus with a voice recognition capability, the proximity sensor of the voice recognition device senses it in step S710 and may activate a sensor for activating an opening/closing operation of the door. Thereafter, when the user opens the door, the door operation is sensed in step S720 and a sensor which senses the change of internal contents may be activated. When the user puts an object into the voice recognition device or removes an object therefrom, the above-described weight sensor or the internal camera may sense it in step S730.

In this case, the user may be highly likely to cause the voice recognition device to perform a specific operation so that the voice recognition device initiates the voice command recognition and generates a signal indicating standby for the voice recognition to notify the user in step S740.

When a voice command is received within a predetermined time after activating the voice command recognition function in step S750, the voice recognition device may perform a responding operation in accordance with the received voice command in step S770. For example, the user opens the door of the washing machine, puts the laundry (in this case, the washing machine automatically activates the voice recognizer) and then issues a voice command "please, check an amount of detergent". The washing machine may provide information on an appropriate amount of detergent after checking an amount of laundry through the weight sensor in accordance with the command.

When a voice command is not received within a predetermined time after activating the voice command recognition function in step S750, the voice command recognition standby state ends to inactivate the voice recognition function for reducing power consumption and preventing of erroneous voice recognition in step S760.

The above-described flowchart illustrates one of the exemplary embodiments of the present disclosure. It is needless to say that specific voice recognizer activating condition and an operation of the voice recognition device in accordance with the condition may be adopted in various forms according to the purpose of the exemplary embodiment.

FIG. 8 is a view for explaining a method of determining whether a voice recognition function is activated in an apparatus with a voice recognition capability according to an exemplary embodiment of the present disclosure.

In order to perform an operation of activating the voice recognizer by automatically determining a case when a user may issue a voice command without using a wake-up word in the voice recognition device, an artificial intelligence learning model may be used.

Artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from input data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables as a graph structure. Bayesian network may be appropriate for data mining via unsupervised learning.

SVM may include a supervised learning model for pattern detection and data analysis, heavily used in classification and regression analysis.

An ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

Specifically, ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. Furthermore, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a previous layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

In general, a single-layer neural network may include an input layer and an output layer.

In general, a multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

Meanwhile, a deep neural network with a plurality of hidden layers between the input layer and the output layer may be the most representative type of artificial neural network which enables deep learning, which is one machine learning technique.

An ANN can be trained using training data. Here, the training may refer to the process of determining parameters of the artificial neural network by using the training data, to perform tasks such as classification, regression analysis, and clustering of input data. Such parameters of the artificial neural network may include synaptic weights and biases applied to neurons.

An artificial neural network trained using training data can classify or cluster input data according to a pattern within the input data.

Throughout the present specification, an artificial neural network trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is input to the artificial neural network.

Throughout the present specification, the target answer (or a result value) to be guessed by the artificial neural network when the training data is input may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be input to an artificial neural network as a training set.

Meanwhile the training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether input data is from the true data or from the new data generated by the generator.

Furthermore, the generator may receive and learn from data that has failed to fool the discriminator, while the discriminator may receive and learn from data that has succeeded in fooling the generator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data output from the hidden layer may be input to the output layer. Given that the number of nodes in the output layer is greater than the number of nodes in the hidden layer, the dimensionality of the data increases, thus leading to data decompression or decoding.

Furthermore, in the AE, the input data is represented as hidden layer data as interneuron connection strengths are adjusted through training. The fact that when representing information, the hidden layer is able to reconstruct the input data as output by using fewer neurons than the input layer may indicate that the hidden layer has discovered a hidden pattern in the input data and is using the discovered hidden pattern to represent the information.

Semi-supervised learning is a machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process.

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

Also, the hyperparameters are set before learning, and model parameters can be set through learning to specify the architecture of the artificial neural network by the configuration of the model, the activation function, the loss function or the cost function, the learning argorithm, the optimization algorithm, or the like.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross-entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the value of a loss function by using a current slope of the loss function.

The direction in which the model parameters are to be adjusted may be referred to as a step direction, and a size by which the model parameters are to be adjusted may be referred to as a step size.

Here, the step size may mean a learning rate.

GD may obtain a slope of the loss function through use of partial differential equations, using each of model parameters, and updates the model parameters by adjusting the model parameters by a learning rate in the direction of the obtained slope.

SGD may include a method that separates the training data into mini-batches, and by performing gradient descent for each of these mini-batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction in NAG. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

In order to generate a learning model used to determine whether to activate the voice recognizer, which may be used for the exemplary embodiment of the present disclosure, data for operations performing before the user issues a voice command to an apparatus with a voice recognition capability (for example, an operation of accessing the apparatus with a voice recognition capability, an operation of manipulating the door, an operation of putting an object in the apparatus or taking out an object from the apparatus, and circumstantial information) is prepared and whether to issue the voice command is labeled to the data.

Supervised-learning is performed on the deep neural network model using the labeled data and the model which is learned by sufficient data may predict whether the voice command is followed in accordance with the operation of the user sensed by the apparatus.

Information sensed by the proximity sensor to notify the operation of the user, door operation information sensed by the door sensor, inserted object information sensed by the internal sensor, and circumstantial information sensed by other external sensors (a temperature sensor, a motion sensor, etc.) may be input to the trained learning model so that whether to activate the voice recognizer may be output.

The situation in which the voice recognizer needs to be activated may be more deliberately estimated using a deep neural network model learned as described above.

The deep neural network model may be used in an apparatus with a voice recognition capability or an apparatus which generates a voice recognizer activating signal.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms 'a/an' and 'the' include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. An apparatus with a voice recognition capability, the apparatus comprising:
a container having an opening at one side and configured to accommodate an object therein;
a door located at the one side and configured to open and close to cover the opening;
a sensor configured to sense an open or closed state of the door;
a microphone configured to receive audio;
a proximity sensor configured to detect a presence of a person; and
a controller configured to activate a voice recognizer of the apparatus in connection with a closed state of the door being changed to an open state or the open state of the door being changed to the closed state,
wherein the controller is further configured to:
activate the sensor to sense an open or close state of the door when the person is detected via the proximity sensor, and
activate the voice recognizer when the person is detected within a predetermined range for a predetermined length of time, via the proximity sensor, after the open state of the door is changed to the closed state.

2. The apparatus according to claim 1, further comprising a camera configured to capture an image of an interior of the container, wherein the controller is further configured to activate the voice recognizer based on detecting a change in an arrangement of the object in the container based on the captured image after the closed state of the door is changed to the open state.

3. The apparatus according to claim 1, further comprising a weight sensor configured to sense a weight of the object in the container, wherein the controller is further configured to activate the voice recognizer based on detecting a change in an arrangement of the object in the container based on weight information sensed via the weight sensor after the closed state of the door is changed to the open state.

4. The apparatus according to claim 1, further comprising an indicator configured to indicate when the voice recognizer is activated.

5. An apparatus for use in a system capable of voice recognition, the apparatus comprising:
a container having an opening at one side and configured to accommodate an object therein;
a door located at the one side and configured to open and close to cover the opening;
a sensor configured to sense an open or closed state of the door;
a network interface configured to communicate with an external voice recognition device;
a proximity sensor configured to detect a presence of a person; and
a controller configured to:
transmit, via the network interface, a signal for activating a voice recognizer of the external voice recognition device in connection with a closed state of the door being changed to an open state or the open state of the door being changed to the closed state,
wherein the controller is further configured to:
activate the sensor to sense an open or close state of the door when the person is detected via the proximity sensor, and
transmit, via the network interface, a signal for activating the voice recognizer of the external voice recognition device when the person is detected within a predetermined range for a predetermined length of time, via the proximity sensor, after the open state of the door is changed to the closed state.

6. The apparatus according to claim 5, further comprising a camera configured to capture an image of an interior of the container, wherein the controller is further configured to transmit, via the network interface, a signal for activating the voice recognizer of the external voice recognition device based on detecting a change in an arrangement of the object in the container based on the captured image after the closed state of the door is changed to the open state.

7. The apparatus according to claim 5, further comprising a weight sensor configured to sense a weight of the object in the container, wherein the controller is further configured to transmit, via the network interface, a signal for activating the voice recognizer of the external voice recognition device based on detecting a change in an arrangement of the object in the container based on weight information sensed via the weight sensor after the closed state of the door is changed to the open state.

8. The apparatus according to claim 5, wherein the external voice recognition device further comprises an indicator configured to indicate when the voice recognizer is activated, and wherein the transmitted signal causes the indicator to be operated.

9. A method for controlling an apparatus with a voice recognition capability, the method comprising:
detecting a presence of a person via a proximity sensor of the apparatus;
upon detection of a person, activating a sensor configured to sense an open or close state of the door;
sensing an open or closed state of a door of the apparatus;
activating a voice recognizer when an object is inserted into the apparatus or removed from the apparatus after a closed state of the door is changed to an open state;
performing a command when a voice command for the command is received within a predetermined time after activating the voice recognizer or inactivating the voice recognizer when a voice command is not received within a predetermined time after activating the voice recognizer; and
activating the voice recognizer when a presence of a person is detected within a predetermined range for a predetermined length of time, via the proximity sensor of the apparatus, after the open state of the door is changed to the closed state.

10. The method according to claim 9, further comprising determining whether the object has been inserted or removed based on an image of an interior of the apparatus captured by a camera of the apparatus after the closed state of the door is changed to the open state.

11. The method according to claim 9, further comprising determining whether the object has been inserted or removed based on weight information sensed by a weight sensor after the closed state of the door is changed to the open state.

12. The method according to claim 9, further comprising indicating when the voice recognizer is activated via an indicator.

* * * * *